(12) United States Patent
Canale et al.

(10) Patent No.: US 7,040,121 B2
(45) Date of Patent: *May 9, 2006

(54) SEALING LIGHTING DEVICE COMPONENT ASSEMBLY WITH SOLDER GLASS PREFORM BY USING INFRARED RADIATION

(75) Inventors: Joseph E. Canale, Painted Post, NY (US); Stephen L. Cooch, Big Flats, NY (US); William L. Haynes, Painted Post, NY (US); Clayton L. Tuttle, II, Corning, NY (US)

(73) Assignee: Corning Incorporated, Corning, NY (US)

(*) Notice: Subject to any disclaimer, the term of this patent is extended or adjusted under 35 U.S.C. 154(b) by 418 days.

This patent is subject to a terminal disclaimer.

(21) Appl. No.: 10/284,588

(22) Filed: Oct. 31, 2002

(65) Prior Publication Data

US 2004/0083760 A1 May 6, 2004

(51) Int. Cl.
*C03C 27/00* (2006.01)
*C03C 3/74* (2006.01)

(52) U.S. Cl. .................. 65/34; 65/36; 501/76
(58) Field of Classification Search .............. 65/34, 65/36, 42; 313/331–333, 317, 318.1, 323; 445/29, 35, 46, 23, 24–25, 44, 73; 501/73–77, 501/79
See application file for complete search history.

(56) References Cited

U.S. PATENT DOCUMENTS

| | | | |
|---|---|---|---|
| 3,088,834 A | | 5/1963 | Pirooz |
| 3,127,278 A | | 3/1964 | Francel et al. |
| 3,609,437 A | * | 9/1971 | Tol et al. .................... 313/625 |
| 3,645,839 A | * | 2/1972 | Veres .......................... 428/427 |
| 3,778,242 A | * | 12/1973 | Francel et al. ................. 65/43 |
| 3,787,780 A | * | 1/1974 | Powell ......................... 372/65 |
| 3,841,883 A | * | 10/1974 | Sherk et al. ................... 501/15 |
| 3,873,330 A | * | 3/1975 | Sherk et al. ................... 501/15 |
| 3,904,428 A | * | 9/1975 | Frieser et al. ................. 501/15 |
| 3,912,482 A | * | 10/1975 | La Grouw et al. .............. 65/43 |
| 3,942,993 A | * | 3/1976 | La Grouw et al. ............ 501/16 |
| 3,947,279 A | * | 3/1976 | Hudecek ........................ 501/2 |
| 3,961,114 A | * | 6/1976 | Berkenblit et al. ........... 428/38 |
| 3,964,920 A | * | 6/1976 | Davis et al. .................. 501/15 |
| 3,975,176 A | | 8/1976 | Salisbury |
| 4,131,478 A | * | 12/1978 | Davis et al. .................. 501/15 |

(Continued)

FOREIGN PATENT DOCUMENTS

GB  484555  5/1938

(Continued)

OTHER PUBLICATIONS

Sem-Com Sealants, publication, retrieved from www.sem-com.com on Dec. 13, 2005, 11 pages.*

(Continued)

*Primary Examiner*—Carlos Lopez
(74) *Attorney, Agent, or Firm*—Siwen Chen

(57) ABSTRACT

Disclosed is a method for sealing and affixing a component assembly for an electrical lighting device to a glass lamp envelope. The assembly used in the process comprises the component, such as an electrode lead wire and a solder glass perform. The process is useful, for example, in hermetically sealing and affixing lamp components, such as electrical lead wires and exhaust tubulation, to a low pressure fluorescent discharge lamp envelope having phosphor coating already applied thereto. The present invention is particularly suitable for lamp envelope made of borosilicate glass having a CTE from 0 to 300° C. in the range of $30\text{--}45 \times 10^{-7}$ $C.^{-1}$.

22 Claims, 7 Drawing Sheets

U.S. PATENT DOCUMENTS

| | | | |
|---|---|---|---|
| 4,238,704 A | 12/1980 | Bonk et al. | |
| 4,256,495 A * | 3/1981 | Kawamura et al. | 501/15 |
| 4,328,022 A | 5/1982 | Bonk et al. | 65/43 |
| 4,721,886 A * | 1/1988 | Oomen et al. | 313/623 |
| 4,855,261 A * | 8/1989 | Mizuno et al. | 501/76 |
| 5,288,255 A * | 2/1994 | Brabham et al. | 445/26 |
| 5,834,888 A | 11/1998 | Allen et al. | |
| 5,858,046 A | 1/1999 | Allen et al. | |
| 6,166,491 A | 12/2000 | Tsuchiya | 315/169.3 |
| 6,301,932 B1 | 10/2001 | Allen et al. | |
| 6,391,809 B1 * | 5/2002 | Young | 501/57 |
| 6,432,853 B1 | 8/2002 | Hares et al. | 501/62 |

FOREIGN PATENT DOCUMENTS

| | | |
|---|---|---|
| JP | 09/035689 | 7/1997 |

OTHER PUBLICATIONS

Dalton, R.H., "Sealing with Solder Glass," *Amer Jour of Phys*, vol. 32, No. 6, pp. 479-482, Mar., 1963.

Alpha, J. W., "Glass Sealing Technology for Displays," *Optics and Laser Technology*, pp. 259-264 (Dec. 1976).

* cited by examiner (Prior Art)

US 7,040,121 B2

1

SEALING LIGHTING DEVICE COMPONENT ASSEMBLY WITH SOLDER GLASS PREFORM BY USING INFRARED RADIATION

FIELD OF THE INVENTION

The present invention relates to processes for sealing and affixing a component assembly to glass envelopes of electrical lighting devices by using infrared radiation. In particular, the present invention relates to a process for sealing and affixing a component assembly comprising a solder glass preform and the lamp component by using infrared radiation. The present invention is useful, for example, in hermetically sealing and affixing lamp components, such as electrical lead wires and exhaust tubulation, to a low pressure fluorescent discharge lamp envelope having phosphor coating already applied thereto.

BACKGROUND OF THE INVENTION

Electrical lighting devices, including incandescent, fluorescent, high intensity discharge and halogen lamps, as well as cathode ray tubes, usually comprise a hermetically sealed glass envelope. Electrodes, incandescent filament, exhaust tubes and other components are hermetically sealed and affixed to the glass envelope. The electrodes and the incandescent filaments are generally housed within the glass envelope. The lead wires of the electrodes must be hermetically sealed with the glass envelope. Beaded leads are traditionally used in these many lighting devices to effect the glass-to-metal seals. FIG. 1 shows schematically the design of a traditional beaded leads, which consists of three pieces: an inner nickel or tungsten lead 13, an outer stranded nickel lead 11, and an intermediate tungsten lead 15. A glass bead 17 is hermetically sealed over the middle tungsten lead. For borosilicate lamp applications, the bead is usually made of borosilicate glass as well. Traditionally, flame burner technology is used in sealing the bead to the glass envelope. Burners provide the necessary heat to soften and fuse the two glass components together to form a hermetic seal. Having glass-to-glass contact ensures that the electrical feed-through is fully hermetic within the lighting device.

A typical fluorescent lamp comprises a glass envelope having an enclosed discharge channel. Inside the discharge channel are placed electrodes, mercury, getters, phosphor coatings and inert gases. Inert gases and/or mercury vapor sealed inside the channel, excited by electrical energy, emit ultraviolet radiation together with a small amount of visible light. Phosphor particles, usually sized on the micro level, covert the ultraviolet radiation into visible light via the mechanism called fluorescence. As in other lighting applications, the exhaust tube is sealed outside of the glass lamp envelope. Recently, a new generation of fluorescent lamp has been developed especially for use as the backlighting unit for information displays, such as the LCD display and other displays requiring an illumination source. These lamps feature a flat geometry having a convoluted discharge channel enclosed inside. To achieve good lighting efficiency and appealing color, rare-earth tri-phosphors are typically applied onto the internal wall of the discharge channel on these lamp envelopes. As in other fluorescent light devices, getters, electrodes, mercury and inert gases as well as exhaust tubes are to be hermetically sealed with the glass envelope. A method of producing such flat panel lamp envelope is disclosed in U.S. Pat. No. 6,301,932. The glass envelope produced in accordance with this method has a once-piece design, viz., the faceplate and the backplate are sealed together to form an integral lamp body having a convoluted channel. To meet the requirements of many applications, especially those of the portable devices, such as a notebook computer, a handheld computer, and the like, lightweight flat panel backlight unit has been produced. These lamp envelopes may have a very thin substrate with a wall thickness often even below 1 mm.

For these flat panel lamp envelopes, especially the one-piece lamp envelope produced in U.S. Pat. No. 6,301,932, electrodes, getters and exhaust tubes are typically sealed with the lamp envelope after the phosphor coating has been applied. Hermetic sealing the electrodes, exhaust tubes and other components to the lamp envelope has been proven to be a challenge. Flame sealing technology suitable for traditional lighting devices has proven to be difficult, if not impossible, to be directly used for these applications in the conventional way. First, the excessive heat generated by the burner flame will soften the glass envelope, causing the thin glass walls to sag and leading to deformation. The serpentine channel geometry requires sealing on a flat surface often of glass thickness less than 1 mm. Though possible, flame working glass components to a flat surface typically results in a deformed seal area, subsequently affecting the overall thickness of the lamp and mechanical strength. Second, these lamp envelopes with large area and complex geometry are very sensitive to temperature differentials. The temperature differentials involved in flame sealing can easily cause them to crack. Third, the phosphor coatings, getter and electrodes are sensitive to high temperature. Exposure of the phosphor coating to a temperature over 600° C. will greatly diminish its functionality, lowering lamp output and subsequent life. Getters, when subjected to high temperature before the channel is evacuated and hermetically sealed, may be activated prematurely, react with the atmosphere in the channel, and thus lose their intended functions. The electrode bells are usually coated with a layer of special emission coating material on its outer surface. When heated to a temperature over 600° C., the coatings will be destroyed or negatively affected as well. Oftentimes, using direct flame sealing technology in a conventional manner cannot avoid heating the phosphors, getters and electrodes, which are located usually not far from the sealing area. Some natural outcomes, therefore, for example, are destroyed or deteriorated lamp components, lamp dysfunction or shortened lamp life, and reduced lamp brightness uniformity. Fourth, in many lamp applications, the holes to be sealed are much larger than the solder glass bead on a beaded lead wire, making it difficult, if not impossible, to directly seal the beaded lead wire to the glass envelope using conventional flame sealing technology. Finally, using a burner flame can introduce unwanted impurities into the lamp discharge channel such as hydrocarbons, which are detrimental to the lamp brightness, brightness uniformity and lamp life.

Therefore, there is a genuine need of a new approach for sealing the flat panel lamps in place of the conventional direct flame sealing technology, where localized heating can be used to effect a hermetic sealing and affixing lamp components, such as electrode leads and tubulations, without affecting the crucial and sensitive lamp components.

Solder glasses have been used to achieve glass-to-glass or glass-to-metal sealing. Solder glasses can be vitreous or devitrifying. Vitreous solder glasses maintain a glass state after sealing. They are thermoplastic materials which melt and flow at the same temperatures each time they are melted. Devitrifying solder glasses, commonly referred to as frits, are thermosetting, meaning they are no longer in glassy state after sealing, but contains both glassy and crystalline phases. Because of their thermosetting properties, devitrifying solder glasses have many advantages and preferred in many applications against the vitreous ones. Once crystallized, devitrifying solder glasses have a higher modulus of rupture of about $4.2-5.6\times10^{-6}$ kg·m$^{-2}$ compared with about $2.1-3.5\times10^{-6}$ mg·m$^{-2}$ for its vitreous precursors and counterparts. Moreover, the softening point of the devitrified frits is essentially increased to above the initial softening point of their vitreous precursors. The overall effect would be a seal stronger and more stable at elevated temperatures.

Solder glasses enable the use of localized heating to effect a hermetic seal. Besides, solder glass can be used to fill in the gaps between a component, such as the bead of a beaded lead wire and tubulations such as the exhaust tube, and the periphery of a larger hole in which the component is to be hermetically sealed. Therefore, they are attractive in sealing the flat panel lamps.

Because an electrical lamp generates heat during its operation, it is desirable to use a low-expansion glass to manufacture glass envelopes. Borosilicate glasses having a coefficient of thermal expansion (CTE) in the range of $30-45\times10^{-7\circ}$ C.$^{-1}$ from 0 to 300° C. have been used for lighting devices, including flat panel lamp envelopes. However, it has proven to be challenging to find the suitable solder glass and sealing method for sealing the lamp components with the borosilicate lamp envelope.

The present invention, by providing a process for sealing and affixing a component assembly comprising an infra-red absorbing solder glass preform and the component to be sealed using infrared radiation, addresses the concerns outlined above.

SUMMARY OF THE INVENTION

The present invention provides a process for hermetically sealing a component to a lamp envelope of a lighting device made of glass having a CTE $C_1$ from 0 to 300° C., comprising the following steps:

(i) providing a component assembly comprising the component to be sealed with the lamp envelope and an infrared absorbing solder glass preform enclosing and bonded to the portion of the component to be hermetically sealed and affixed to the glass lamp envelope, wherein the solder glass of the preform has a before-sealing softening point $T_s$ over 500° C., an after-sealing CTE $C_2$ from 0 to 300° C. in the range of $C_1 \pm 10\times10^{-7\circ}$ C.$^{-1}$, and is capable of forming a hermetic sealing of the component with the lamp envelope upon being heated to a temperature over its before-sealing softening point $T_s$;

(ii) attaching the component assembly to the hole of the lamp envelope through which the component is to be sealed and affixed to the lamp envelope; and (iii) heating the solder glass preform locally using infrared radiation to a temperature higher than the before-sealing softening point $T_s$ of the solder glass to effect a hermetic sealing.

Preferably, the process of the present invention is used for lamp envelopes made of borosilicate glass having a CTE $C_1$ from 0 to 300° C. in the range of $30-45\times10^{-7\circ}$ C.$^{-1}$ Preferably, the solder glass of the preform used in the process of the present invention is formed from a devitrifying solder glass consisting essentially of a $B_2O_3$—$SiO_2$—$PbO$—$ZnO$ glass containing CuO and/or $Fe_2O_3$, having a before-sealing softening point in the range of 550–700° C., an after-sealing CTE $C_2$ from 0 to 300° C. in the range of $32-40\times10^{-7\circ}$ C.$^{-1}$ and a devitrifying temperature $T_d$ in the range of 630–750° C. More preferably, the solder glass preform in the component assembly of the present invention is formed from a solder glass consisting essentially, by weight percentage on an oxide basis calculated from the batch, of: 0–2% of $Al_2O_3$, 15–25% of $B_2O_3$, 1–5% of CuO, 0–5% of $Fe_2O_3$, 0–7% of PbO, 10–16% of $SiO_2$ and 55–65% ZnO, and having a before-sealing softening point in the range of 550–700° C., preferably 600–650° C., an after-sealing CTE $C_2$ from 0 to 300° C. in the range of $32-40\times10^{-7\circ}$ C.$^{-1}$, preferably $34-38\times10^{-7\circ}$ C.$^{-1}$, and a devitrifying temperature $T_d$ in the range of 630–750° C., preferably 650–700° C.

According to one preferred embodiment of the present invention, the component to be hermetically sealed and affixed to the glass envelope is a beaded electrode lead wire. Preferably, the beaded lead wire has an outer lead wire, an inner lead wire, and an intermediate lead wire, and the intermediate lead wire is hermetically sealed with a solder glass bead.

According to another preferred embodiment of the present invention, the component to be hermetically sealed and affixed to the glass envelope is a glass tubulation having a similar CTE to the glass envelope. The tubulation may be an exhaust tube of the glass envelope. Alternatively, according to one embodiment of the present invention, beaded electrode lead wire can be placed inside the tubulation, which, upon prior or further heating, can form a hermetic seal between the tubulation and the bead.

In one embodiment of the present invention, the solder glass preform of the component assembly of the present invention has a shape receivable by or capable of covering the hole of the glass envelope through which the component is to be sealed and affixed.

In one preferred embodiment of the present invention, the solder glass preform has a one-step structure consisting of two integrated parts $P_1$ and $P_2$, wherein $P_1$ has a smaller cross-sectional size than $P_2$ and is receivable by the hole through which the component is to be sealed and affixed to the lamp envelope, and $P_2$ has a larger cross-sectional size capable of covering the hole when $P_1$ is inserted into and received by the hole.

By heating the solder glass preform in the component assembly of the present invention in a localized manner using infrared radiation, a hermetic sealing between the component and the glass envelope can be effected in a short period of time without causing substantial temperature increase to the adjacent lamp area, thus potential deformation of the lamp envelope, destruction of the phosphor coatings, getters and electrodes are avoided. The present invention is particularly suitable for sealing flat panel lamp envelopes that are sensitive to high temperatures and for which traditional flame sealing technology cannot be used, for example, flat panel lamp envelopes with phosphor coating already applied thereto.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description and drawings are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

For the purpose of the present invention, a "component assembly" means an assembly containing (i) an electrical lamp component, such as an electrode lead wire, tubulation, and the like, to be sealed and affixed to a glass lamp envelope, and (ii) a solder glass preform. Once hermetically sealed and affixed to the lamp envelope, the component becomes a structural and functional part of the lamp envelope.

Figure 1:
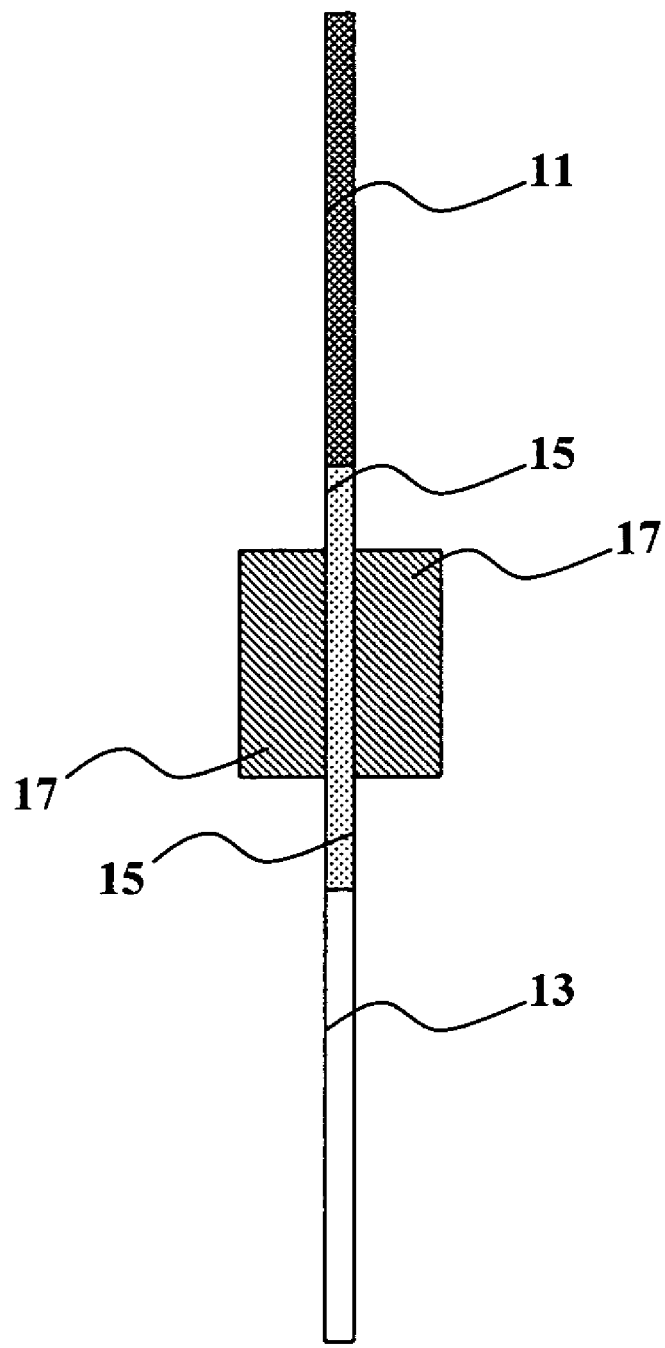
FIG. 1 is a schematic cross-sectional view of a beaded electrode lead wire consisting of an outer lead, an inner lead and an intermediate lead having a hermetically sealed solder glass bead.

As described supra, hermetic sealing of electrode leads, getters, exhaust tubes, and other lamp components to a flat panel lamp envelope, especially those which a phosphor coating has been applied to, has proven to be a challenge. For a simpler lamp envelope design, such as an incandescent lamp and a tubular fluorescent lamp, the traditional flame sealing method can be conveniently used for hermetic sealing a beaded lead wire as illustrated in FIG. 1 or an exhaust tubulation to the glass envelope. However, for the reasons detailed supra, direct flame sealing in a similar fashion has proven to be difficult, if not impossible, to use in hermetic sealing for flat panel lamp applications. Recently, a new method of producing flat panel lamp envelope has been disclosed in U.S. Pat. No. 6,301,932. The lamp envelope produced in accordance with this method features a one-piece design, viz., the faceplate and the backplate of the lamp are formed into once piece enclosing a convoluted discharge channel inside. For this lamp design, a phosphor coating must be applied onto the internal wall of the discharge channel before the sealing of electrodes, getters and exhaust tubulation. The holes on the glass lamp envelopes for applying phosphor coating as well as for sealing and affixing the electrodes and exhaust tubulations, are typically larger than the solder glass bead of a beaded lead wire. It has been proven that the hermetic sealing of electrodes and exhaust tubulation to this one-piece glass lamp envelope is particularly difficult without deforming the lamp body, destroying or otherwise negatively affecting the crucial components of the lamp, including the getters and the electrode components, the phosphor coating, which is usually formed of a rare-earth tri-phosphor very sensitive to temperature over 600° C.

Electrical lamps generate heat during their normal operation. As such, low-expansion glasses such as borosilicate glasses have been used in lamp applications.

A new component assembly comprising a solder glass preform and the lamp component to be sealed and affixed to the lamp envelope has been recently developed. This new component assembly can be conveniently used for hermetic sealing of a borosilicate glass lamp envelope with phosphor already applied thereto and affixing lamp components such as electrode lead wire and exhaust tubulations to the lamp envelope, by using localized infrared heating directed mainly to the solder glass preform.

Solder glass has been in use to realize glass-to-glass and glass-to-metal sealing in many years. For example, U.S. Pat. Nos. 4,238,704, 3,127,278, 3,975,176 and 3,088,834 all disclosed solder glass compositions for joining glass parts to form a composite glass body. However, the solder glasses and/or method of use thereof disclosed in these references either do not meet the stringent heating conditions as required by a fluorescent flat panel discharge lamp, especially one with phosphor coating already applied, or do not form a hermetic seal under the required sealing conditions. In choosing the right solder glass for a certain application, many technical factors need be taken into consideration. First and foremost, the CTE of the parts to be sealed and the solder glass during the operational temperature range of the application should match, viz., the CTE differentials should not be too large. Second, the compositions of the parts to be sealed and the solder glass must be compatible such that the rheology of the solder glass when heated to the sealing temperature can effect a tight and hermetic seal when hermeticity is required. Third, the capability of the solder glass to be locally heated at an adequate rate is also a concern when special heating source, such as infrared radiation, is used. Not all solder glass have the same absorbing ability of infrared radiation.

The component assembly used in the process of the present invention comprises the component, such as the electrode lead wire, to be sealed with the lamp envelope and a solder glass perform enclosing and bonded to the portion of the component to be hermetically sealed and affixed to the glass lamp envelope. The lamp component assembly is particularly suitable for lamp envelopes made of borosilicate glass having a CTE $C_1$ in the range of $30–45 \times 10^{-7}$ °C.$^{-1}$. However, it should be noted that the lamp component assembly and the sealing method of the present invention are applicable for lamp envelopes having a different glass composition. The solder preform enclosing the component to be sealed has an after-sealing CTE $C_2$ in the range of $C_1 \pm 10 \times 10^{-7}$ °C.$^{-1}$ and is capable of forming a hermetic seal after being heated to a temperature over its before-sealing softening point $T_s$.

The solder glass of the preform used in the process in accordance with the present invention can be either vitreous solder glass or devitrifying solder glass. A vitreous solder glass maintains glassy state after being sealed. Its before-sealing softening point $T_s$ and after-sealing softening point $T_s'$ are substantially the same because there is no phase change during the softening and sealing process. However, a devitrifying solder glass undergoes phase changes at least partially during the softening and sealing process, resulting crystalline phases in the original glassy phase. Therefore, the after-sealing softening point $T_s'$ for a devitrifying solder glass is higher than its before-sealing softening point $T_s$. Regardless of whether the solder glass is vitreous or devitrifying, the sealing temperature thereof must be higher than its before-sealing softening point $T_s$ in order to effect a good hermetic sealing between the lamp component and the lamp envelope. Typically, when a devitrifying solder glass is used, it is heated to a temperature above its devitrifying temperature $T_d$ in order to obtain a good and durable seal.

For a borosilicate glass envelope having a CTE $C_1$, in the range from $30–45 \times 10^{-7}$ °C.$^{-1}$, a preferred solder glass of the preform of the component assembly used in the process of the present invention consists essentially of a devitrifying $B_2O_3$—$SiO_2$—$PbO$—$ZnO$ solder glass containing $CuO$ and/or $Fe_2O_3$, having a before-sealing softening point $T_s$ in the range of 550–700° C., an after-sealing CTE $C_2$ from 0 to 300° C. in the range of $32–40 \times 10^{-7}$ °C.$^{-1}$ and a devitrifying temperature $T_d$ in the range of 630–750° C. More preferably, the solder glass of the preform of the component assembly of the present invention consists essentially, expressed in terms of weight percentage on an oxide basis calculated from the batch material, of: 0–2% of $Al_2O_3$, 15–25% of $B_2O_3$, 1–5% of $CuO$, 0–5% of $Fe_2O_3$, 0–7% of $PbO$, 10–16% of $SiO_2$ and 55–65% $ZnO$, and has a before-sealing softening point $T_s$ in the range from 550–700° C., preferably 600–650° C., an after-sealing CTE $C_2$ from 0 to 300° C. in the range of $32–40 \times 10^{-7}$ °C.$^{-1}$, preferably $34–38 \times 10^{-7}$ °C.$^{-1}$ and a devitrifying temperature in the range of 630–750° C., preferably 650–700° C. These solder glasses ensure a CTE match with the substrate glass of the lamp envelope. Moreover, the rheology of the solder glass when heated to a temperature above its devitrifying temperature and composition compatibility with the substrate glass of the lamp envelope permit the forming of a hermetic seal between the component to be sealed and the glass lamp envelope. Surprisingly, these solder glasses have a strong infrared absorbing ability, which make them suitable candidate for localized heating using infrared radiation beams.

A non-limiting example of the borosilicate glass for the glass envelope consists of, expressed in terms of weight percentage on an oxide basis calculated from the batch materials, 77.4% $SiO_2$, 15.4% $B_2O_3$, 1.9% $Al_2O_3$ and 5.3% $Na_2O$, and has a CTE of approximately $38 \times 10^{-7}$ °C.$^{-1}$ from 0 to 300° C.

In one embodiment of the present invention, the component to be sealed to the glass lamp envelope in the component assembly of the present invention is an electrode lead wire. The resulted component assembly is thus a lead wire assembly to be sealed to the glass envelope. The cross-sectional view of a typical electrode lead wire for use in electrode lighting devices is schematically illustrated in FIG. 1. This lead wire has three parts: a stranded nickel outer lead for connection with power source, an intermediate tungsten lead 15, and an inner nickel or tungsten lead 13. The intermediate tungsten lead 15 is hermetically sealed by a solder glass bead when supplied by the manufacturer. The glass bead can be made of NONEX®, a clear soda lead borosilicate glass for tungsten sealing, having a CTE of about $36.0 \times 10^{-7}$ °C.$^{-1}$ from 0 to 300° C.

In conventional lighting devices, such as incandescent lamps and simple tubular fluorescent lamps, the glass bead enclosing the intermediate tungsten lead is directly sealed to the glass lamp envelope using, for example, flame sealing technology. However, for reasons enumerated supra, this technology is not directly applicable for flat panel lamps, especially those having phosphor coatings applied thereto before sealing of the electrode wires. In the present invention, flame sealing is no longer required for sealing the component assembly to a flat panel lamp envelope. The solder glass preform encloses and bonds to the bead of the beaded electrode lead wire. Upon being heated to a temperature over its before-sealing softening point $T_s$, and/or over its devitrifying temperature when a devitrifying solder glass is used, a hermetic sealing between the solder glass preform and the glass bead on the tungsten intermediate lead wire is effected. The bonding between beaded electrode lead wire and the solder glass preform in the component assembly of the present invention does not have to be as strong and hermetic as the seal obtained after the sealing procedure. The bonding between the solder glass preform and the beaded lead wire before sealing, indeed, may be porous and discontinuous. A mechanical bonding between the solder glass preform and the bead of the lead wire to a certain extent is convenient for down-stream sealing process in that the lead wire and the electrodes welded thereto will not move about because of the bonding, thus a precise seal can be realized. Electrode bells, not shown in the drawings, are usually welded to the end of the inner nickel or tungsten lead, inserted through the hole of the lamp envelope before sealing the beaded lead assembly to the lamp envelope.

Figure 2:
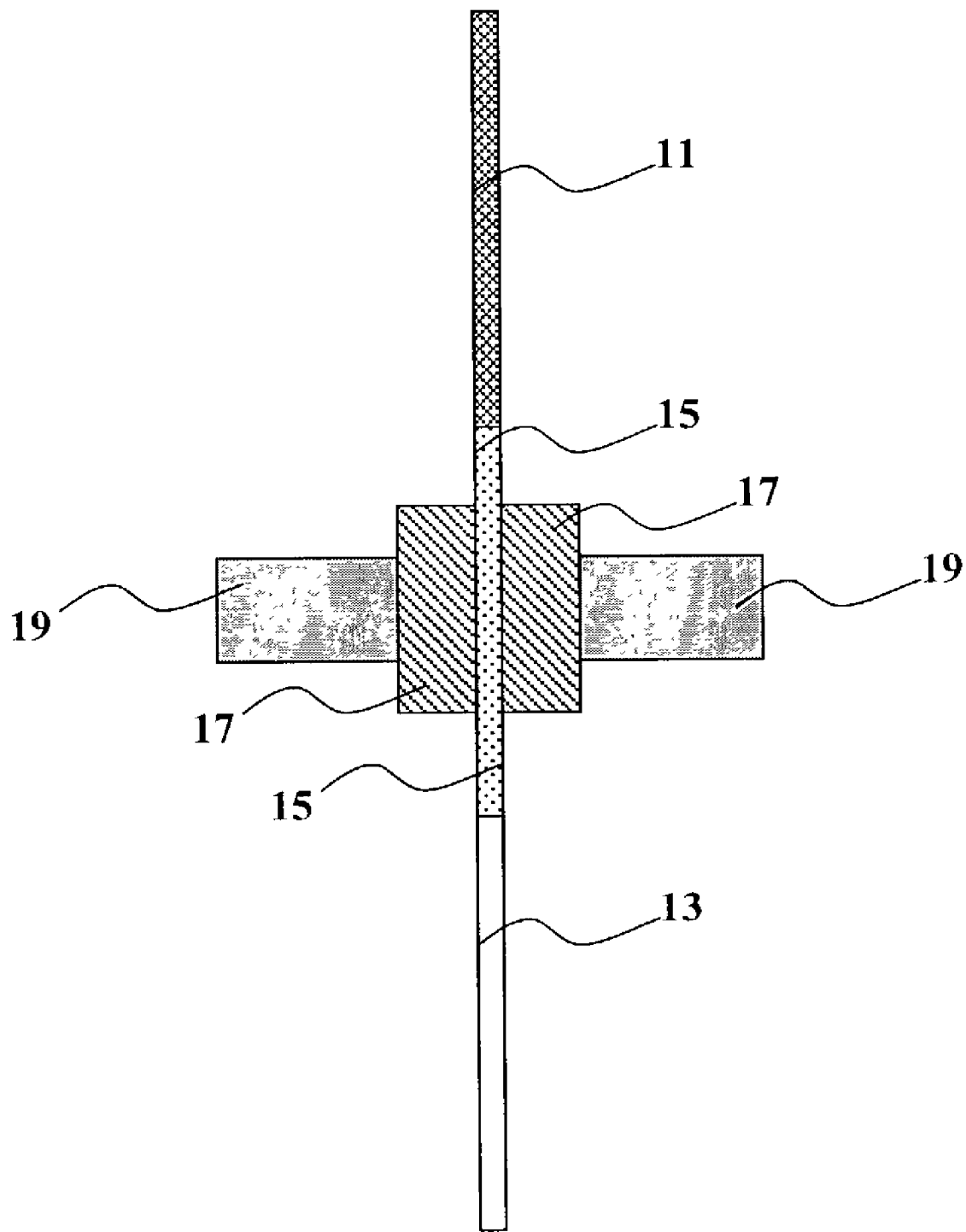
FIG. 2 is a schematic cross-sectional view of a component assembly of the present invention comprising a beaded electrode lead wire and a solder glass preform having a uniform shape receivable by or capable of covering the hole of the lamp envelope through which the assembly is to be sealed and affixed.

FIG. 2 illustrates schematically the cross-sectional view of a component assembly comprising a beaded electrode lead wire and a solder glass preform 19 according to the present invention. As shown in this figure, the glass bead 17 over the intermediate tungsten lead 15 of the beaded electrode lead wire is bonded to the solder glass preform 19. As can be appreciated, the bonding between 17 and 19 may be porous and/or discontinuous and not as intimate as is indicated in this figure. As illustrated in this figure, the solder glass preform in this embodiment has a uniform shape receivable by or capable of covering the hole of the lamp envelope through which the assembly is to be sealed to the lamp envelope. Before sealing of the assembly to the glass envelope, getters are placed into the discharge channel of the lamp envelope and an electrode bell is welded onto the lower end of the inner lead wire 13. Subsequently, the electrode and inner lead wire 13 are inserted into the discharge channel through the hole, and the solder glass preform 19 is placed into and received by the hole or placed atop to cover the hole. Preferably, the top plan view of the solder glass preform should take the same form of the hole so that it can be received by the hole, and a size substantially the same of the hole so that no substantial gap remains between the solder glass preform and the periphery of the hole. For example and for the purpose of illustration only, where the hole is circular, the solder glass preform is advantageously cylindrical. Or, the solder glass perform may have a size larger than the hole, so that the hole can be covered when the perform is placed atop. After localized heating is applied to the solder glass preform, and the solder glass is heated to a temperature above its before-sealing softening point $T_s$, a hermetic seal is effected across the hole.

Figure 3:
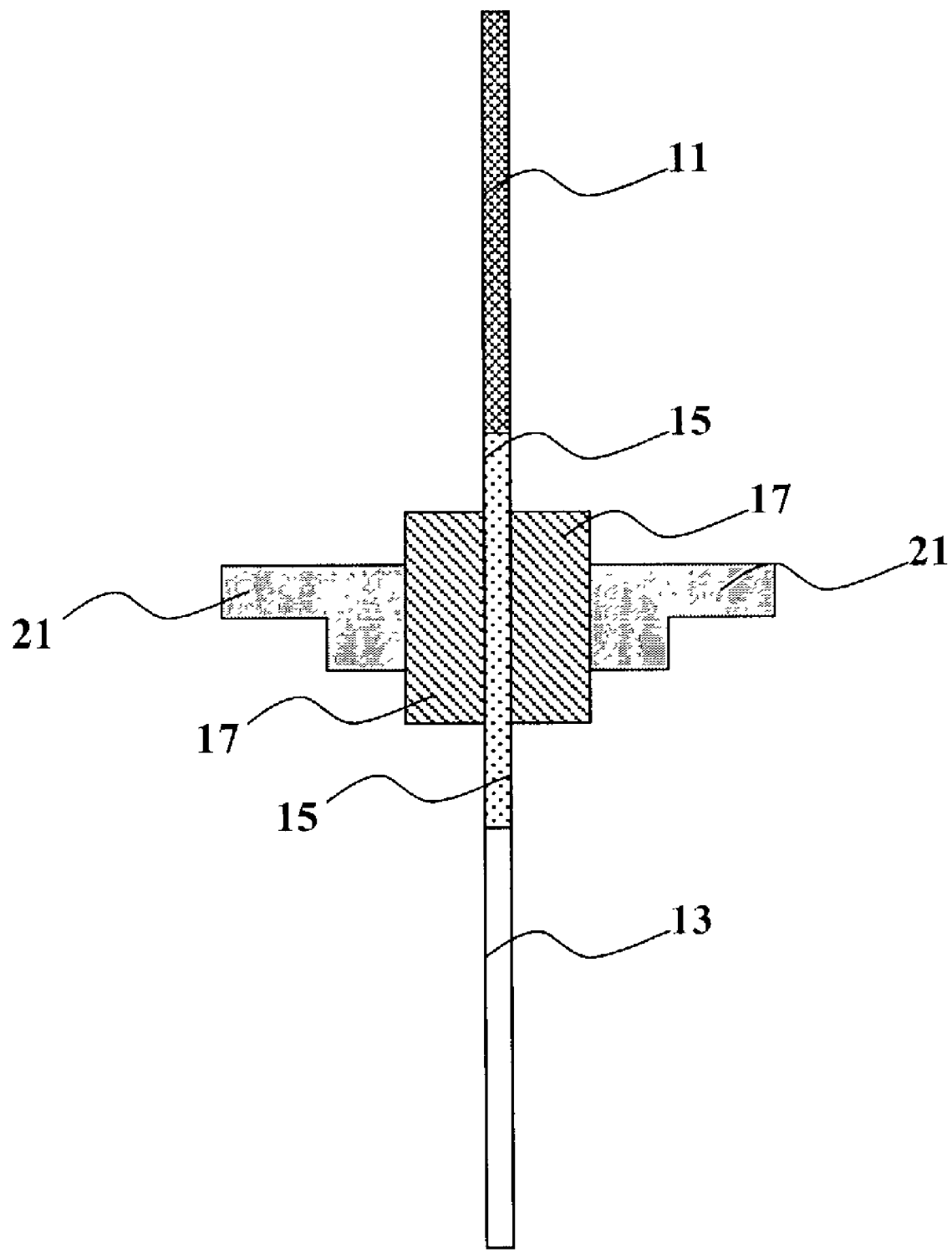
FIG. 3 is a schematic cross-sectional view of a component assembly of the present invention comprising a beaded electrode lead wire and a solder glass preform with a one-step structure having two integrated parts $P_1$ and $P_2$, with $P_1$ being smaller and receivable by the hole through which the assembly is to be sealed and affixed, $P_2$ being larger and capable of covering the hole when $P_1$ is inserted into and received by the hole.

FIG. 3 illustrates schematically the cross-sectional view of another component assembly of the present invention comprising a beaded lead wire and a solder glass preform. In this figure, the glass bead 17 over the intermediate lead 15 is bonded to a solder glass preform 21, which has a one-step structure. The one-step structure consists of two integrated parts $P_1$ and $P_2$ having different cross-sectional size, with $P_2$ large than $P_1$. $P_1$ advantageously has a shape and size receivable by the hole through which the beaded lead is to be sealed and affixed. The size and shape of $P_2$, however, should be chosen such that when $P_1$ is inserted into the hole, $P_2$ can cover the periphery of the hole. FIG. 3 is a preferred design of the beaded lead wire solder glass preform assembly of the present invention. Compared to the design of FIG. 2, the one-step structure of FIG. 3 reduces or prevents the movements of the electrode lead wire with respect to the hole periphery during the sealing process, thus a more precise sealing of the electrode wire centered in the hole can be achieved. It has been found that off-center sealing of the lead wire may lead to cracking of the glass envelope and/or gross leak.

Figure 4:
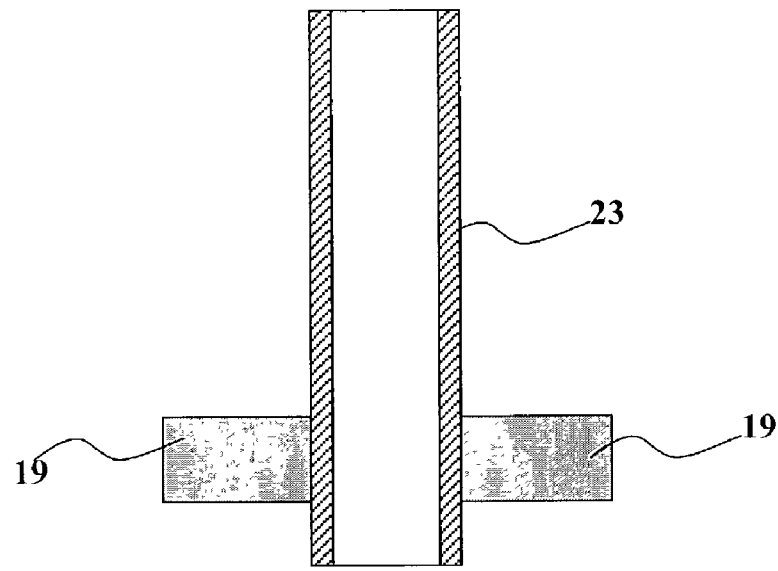
FIG. 4 is a schematic cross-sectional view of a component assembly of the present invention comprising a tubulation and a solder glass preform having a shape receivable by or capable of covering the hole of the lamp envelope through which the assembly is to be sealed and affixed.
Figure 5:
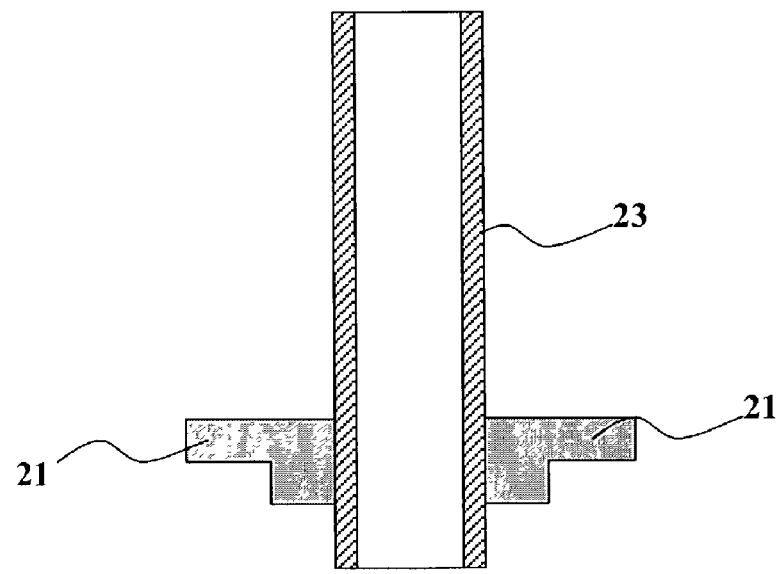
FIG. 5 is a schematic cross-sectional view of a component assembly of the present invention comprising a tubulation and a solder glass preform with a one-step structure having two integrated parts $P_1$ and $P_2$, with $P_1$ being smaller and receivable by the hole through which the assembly is to be sealed and affixed, $P_2$ being larger and capable of covering the hole when $P_1$ is inserted into and received by the hole.

In another embodiment of the present invention, the component to be sealed with the glass envelope in the component assembly is a borosilicate glass tubulation having a CTE $C_3$ in the range of $C_1 \pm 10 \times 10^{-7}$. FIGS. 4 and 5 illustrate the cross-sectional view of this embodiment, where 23 represents the cross-sectional view of the glass tubulation. This tubulation may serve as an exhaust tubulation of the lamp envelope. Likewise, two designs of the solder glass preform for this embodiment have been contemplated and illustrated in FIGS. 4 and 5, respectively. The solder glass preform 19 in FIG. 4 has a uniform shape and size receivable by or capable of covering the hole of the glass envelope through which the tubulation is to be sealed and affixed. The solder glass preform 21 in FIG. 5 has a one-step structure substantially the same as in FIG. 3. Similarly, the FIG. 5 design is a preferred embodiment of the present invention where the component is a tubulation. Compared to the design of FIG. 4, the one-step structure of FIG. 5 reduces or prevents the movements of the tubulation with respect to the hole periphery during the sealing process, thus a more precise sealing of the tubulation can be achieved. Where the tubulation to be sealed to the lamp envelope is an exhaust tubulation, it is usually sealed to a separate hole other than the holes for sealing and affixing electrode lead wires. After the getters have been placed inside the discharge channel, the electrode lead wires and the exhaust tubes all hermetically sealed, the channel evacuated through the exhaust tubulation, mercury and inert gas added to the channel, the exhaust tubulation may be collapsed using flame heating or other heating means to obtain a final discharge lamp setup without causing substantial heating of the crucial and sensitive lamp components. Because the exhaust tubulation is farther from the essentially lamp components than the solder glass preform, flame sealing, when care is exercised, can be used to collapse the exhaust tube without destroying or deforming the lamp envelope. Flame sealing, though also used, is not directly applied to the glass envelope here.

Figure 6:
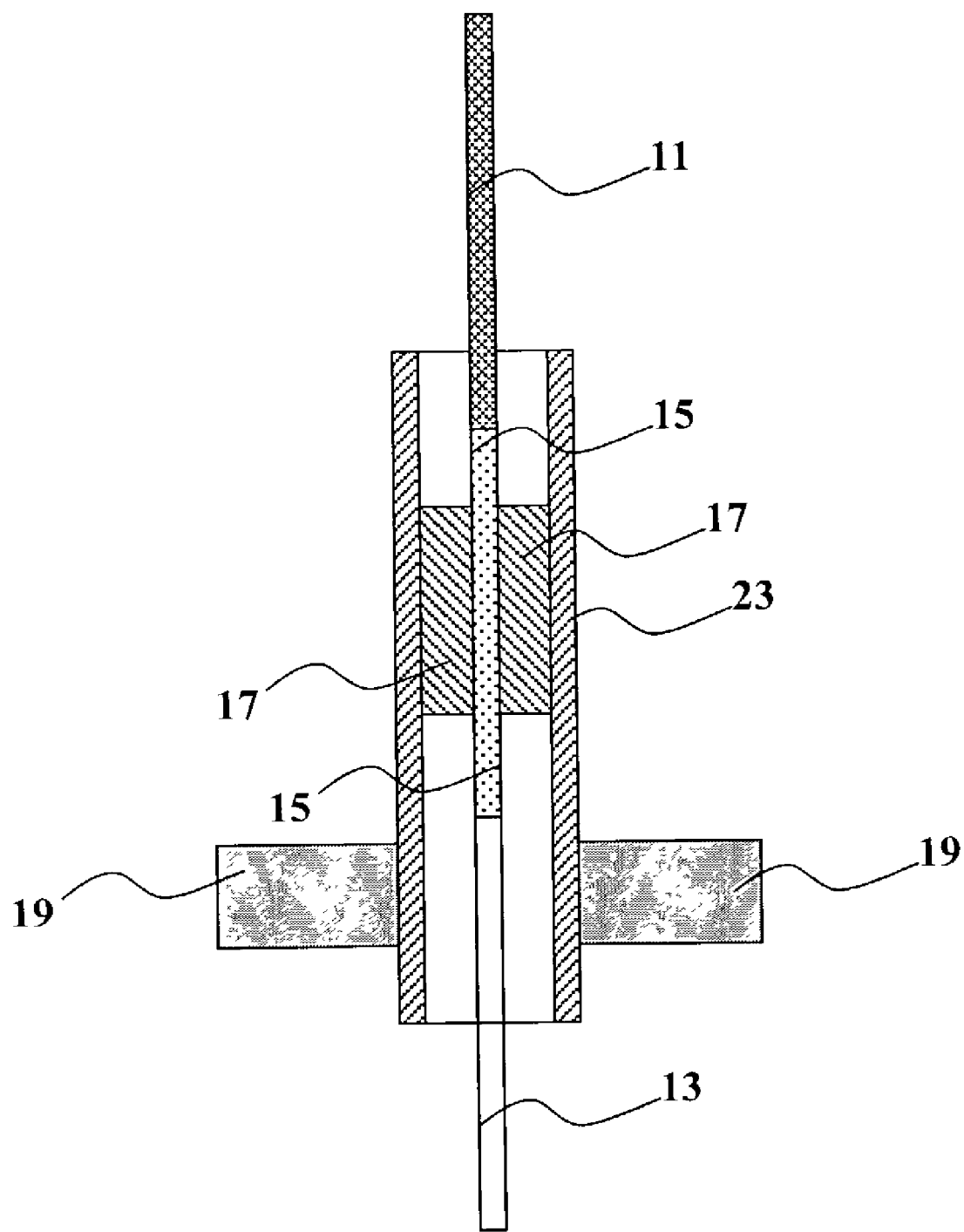
FIG. 6 is a schematic cross-sectional view of a component assembly of the present invention comprising a tubulation and a solder glass preform having a shape receivable by or capable of covering the hole of the lamp envelope through which the assembly is to be sealed and affixed, wherein a beaded lead wire is inserted and placed into the tubulation.
Figure 7:
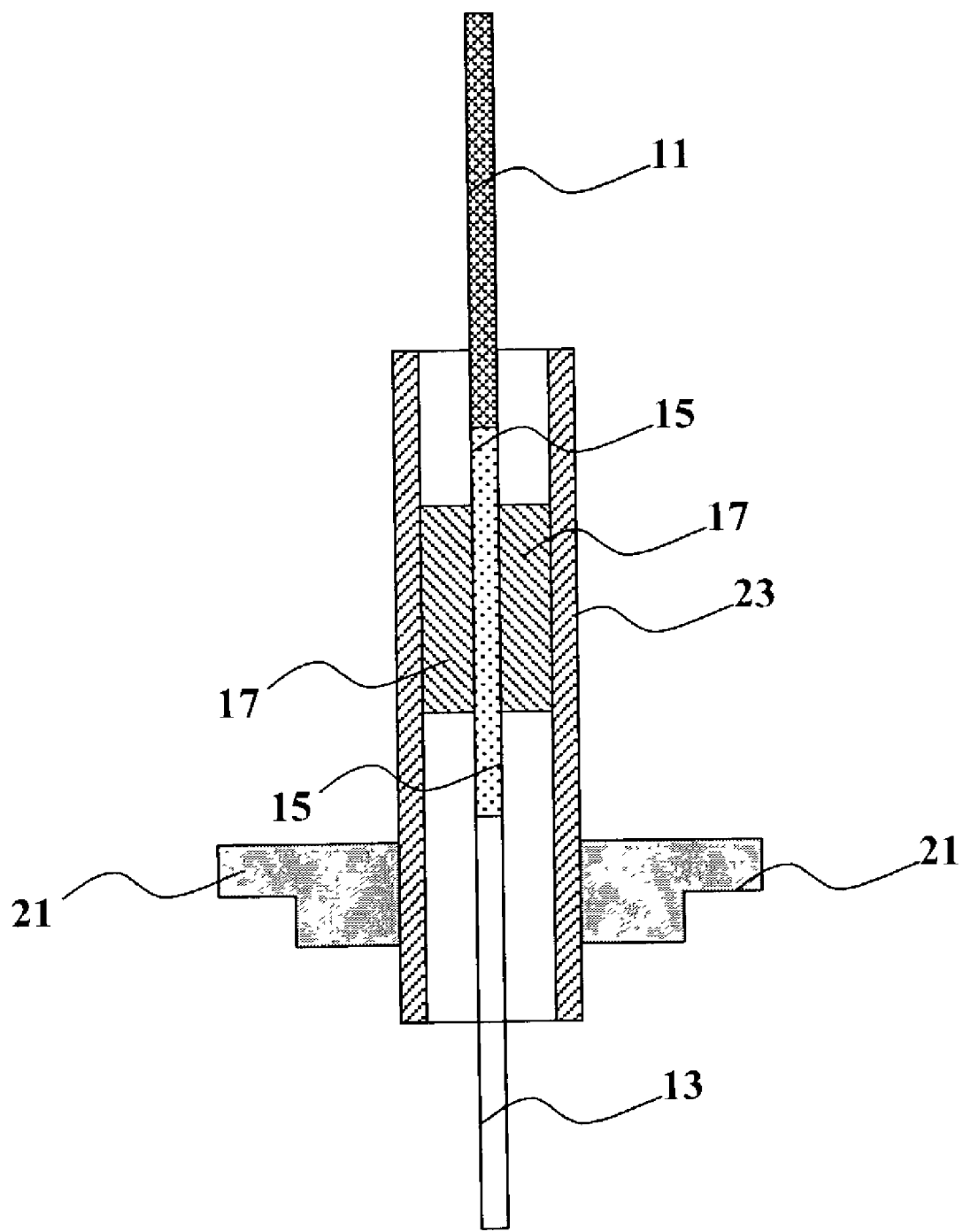
FIG. 7 is a schematic cross-sectional view of a component assembly of the present invention comprising a tubulation and a solder glass preform with a one-step structure having two integrated parts $P_1$ and $P_2$, with $P_1$ being smaller and receivable by the hole through which the assembly is to be sealed and affixed, $P_2$ being larger and capable of covering the hole when $P_1$ is inserted into and received by the hole, wherein a beaded lead wire is inserted and placed into the tubulation.

The tubulations illustrated in FIGS. 4 and 5 may be used for sealing an electrode to the glass envelope, in additional to being used as an exhaust tubulation. FIGS. 6 and 7 illustrate schematically the cross-sectional views of two designs of component assembly comprising a borosilicate glass tubulation, a solder glass preform and a beaded electrode lead wire. Likewise, the FIG. 7 design has a solder glass preform featuring a one-step structure and represents a preferred embodiment in the present invention. Compared to the FIG. 6 design, the one-step structure of FIG. 7 reduces or prevents the movement of the tubulation 23 with respect to the periphery of the hole through which the tubulation is to be sealed during the process of sealing, thus a more precise sealing of the tubulation can be achieved.

In the component assemblies illustrated in FIGS. 6 and 7, a beaded electrode lead wire is inserted into the tubulation to be sealed to the glass lamp envelope before the sealing of the tubulation. The glass bead 17 may have already been hermetically sealed to the tubulation 23 by, for example, flame sealing process, prior to the sealing of the tubulation to the glass lamp envelope. In this scenario, a hermetic seal of the beaded electrode lead wire is obtained when the tubulation 23 is hermetically sealed to the glass lamp envelope. Or alternatively, the beaded electrode lead wire may be inserted into the tubulation 23 without a hermetic sealing therebetween before the tubulation is hermetically sealed to the glass lamp envelope. After sealing the tubulation to the lamp envelope by locally heating the solder glass preforms 19 and 21, hermetic sealing between the glass bead 17 and tubulation 23 can be done using further heating. Again, flame sealing may be used if care is taken given the longer distance between the flame sealing location and the crucial and sensitive components of the lamp envelope.

Various methods of making solder glass preform are known to one of skill in the art. Both vitreous and devitrifying solder glasses are available in power form in a variety of particle distributions that are designed to meet the needs of specific applications. Vitreous solder glasses can be formed into rods for the preparation of sealing frames. Devitrifying solder glasses, however, cannot be formed into rods for sealing frames because of its tendency to crystallize during the redraw process. For both types of solder glasses, they can be dry-pressed, with or without the use of organic binders, to form sealing collars of various desired shapes and configurations for use in, for example, tubulation seals. Or alternatively, they can be extruded and sintered to form sealing strips of desired shapes and designs. Holes for receiving the lamp component, such as the beaded lead wire and the tubulations, can be formed directly during the dry-pressing and/or extruding process, or drilled thereafter. Afterwards, the component is inserted into the hole to form the component-solder glass preform assembly of the present invention. Mechanical bonding to a certain extent between the component and the solder glass preform is desired for the convenience of down-stream processes, and can be effected by sintering the whole assembly at a temperature lower than the before-sealing softening point $T_s$ of the solder glass.

Where organic binders are added to the solder glass in forming the preform, sintering temperature and time should be enough to substantially eliminate them from the preform in order that hazardous organic impurities will not be introduced into the discharge channel of the lamp envelope after sealing. For example, in an preferred embodiment of the present invention, devitrifying solder glass power, with a small amount of ethanol added, is first pressed into a desired shape, such as the cylindrical shape and the one-step shape described, supra. A hole is then drilled through the preform, through which the beaded electrode lead wire or a glass tubulation is then inserted. Subsequently, sintering of the solder glass preform is carried out, whereby the ethanol is eliminated, and a bonding between the solder glass preform and the component is obtained. The thus prepared component assembly of the present invention is ready for sealing with the glass lamp envelope. Typically, especially for the glass envelope with one-piece design, the sealing of the component assembly of the present invention to the lamp envelope is carried out after the phosphor coating has been applied and the getters are placed into the discharge channel. Additional lamp components, such as the electrode bells, and the like, are welded to the end of the inner lead of the beaded electrode lead before sealing the assembly to the lamp envelope.

As described, supra, for flat panel lamp envelopes, especially those which have phosphor coatings already applied, localized heating in sealing the electrode leads and exhaust tubulations to the lamp envelope is desired in order to avoid destroying the heat-sensitive components of the lamp, such as the phosphor coating, getters, and/or deforming the lamp envelope per se. The component-solder glass preform assembly of the present invention makes it possible to use localized heating in sealing the components. When sealing the component assembly to the glass envelope, localized heating source is applied mainly to the solder glass preform. Pressure is optionally applied to the preform where necessary. Preferably, within a short period of time, the solder glass is brought to a temperature over its sealing temperature, where it softens, optionally flows, and/or devitrifies if a devitrifying solder glass is used, to form a hermetic seal between the component and the glass lamp envelope. To avoid excessive heat transfer to the nearby lamp components, such as phosphor coating, getters and the like, it is desired that the sealing time is controlled under 5 minutes, preferably under 3 minutes, more preferably under 1 minute, most preferably within seconds. Optionally, a shield, a reflector and/or a heat-absorbing cover material may be used to shield the rest of the lamp envelope to prevent it from being heated excessively by the heating source used for sealing. Once a hermetic seal is effected, the heating source is removed from the component assembly, and the glass envelope with the seal is allowed to slowly cool down to room temperature. The solder glass hardens during the cooling process to form a strong and hermetic seal.

Figure 8:
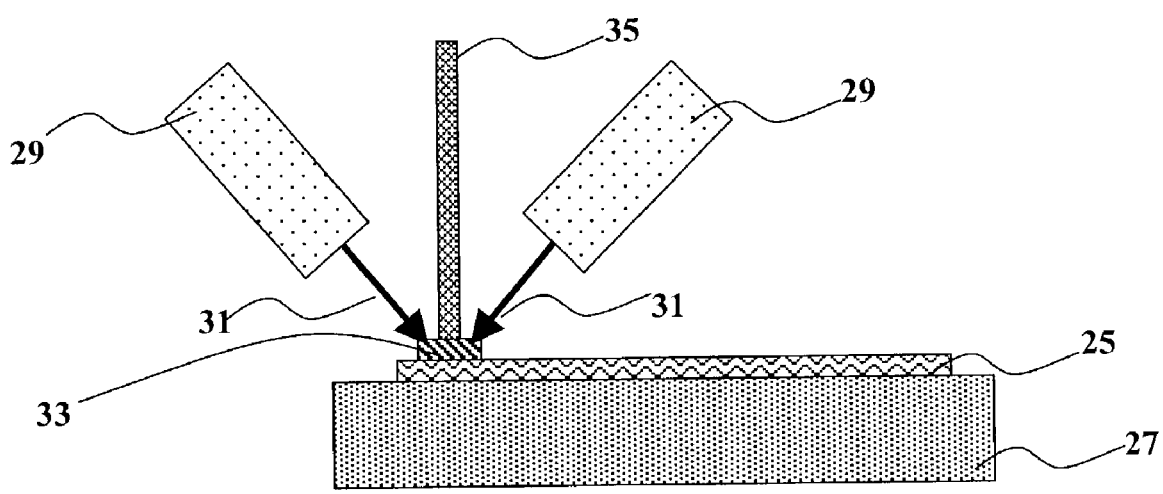
FIG. 8 is a schematic diagram showing an apparatus set-up, in which two linear focused infrared radiation sources are used, for sealing the component to a flat panel lamp envelope using the process of the present invention.

Because of the infrared absorbing ability of the solder glass preform used in the process of the present invention, infrared radiation can be used for localized heating of the solder glass and the sealing area. Infrared lamps can be used as the infrared radiation source. To effect localized heating, the radiation is desirably focused. Curved reflectors can be used to concentrate the infrared radiation energy and direct it substantially only to the sealing area. With enough heating power, the solder glass preform is brought to a temperature higher than its before-sealing softening point, and a hermetic sealing can thus be effected. The adjacent lamp area is not heated directly by the infrared radiation, thus its temperature does not rise as fast. In one preferred embodiment of the present invention, the radiation source is a linear infrared beam. A linear beam has the advantage of being capable of sealing multiple locations, such as two beaded electrode lead wires and an exhaust tubulation, simultaneously. In one preferred embodiment of the present invention, multiple linear infrared radiation sources with converging focused light beams directed to the solder glass preforms and sealing area are used simultaneously. FIG. 8 illustrates schematically the apparatus setup of this embodiments. In FIG. 8, a flat lamp envelope 25 is placed on top of a flat table 27. The component assembly comprising the component 35 and the solder glass preform 33 is inserted into the hole through which the assembly is to be sealed and affixed to the glass envelope 25. Two infrared lamps 29 are used to direct two linear infrared beams 31 to both sides of the solder glass preform 33. In this setup, the preforms can be heated evenly in a short period of time to its sealing temperature.

During the sealing process of the component assembly to the lamp envelope, it is desired to reduce the temperature differential between the glass envelope and the solder glass preform being sealed. If the sealing temperature is excessively higher than the substrate of the lamp envelope, there is a risk of cracking during the sealing process. Therefore, preheating of the lamp envelope is desired before sealing of the component assembly thereto. The preheating is advantageously carried out in an oven, where the lamp envelope, including the phosphor coating applied thereto, is brought to a higher temperature safe to the phosphor coatings. For lamps using rare-earth tri-phosphor coatings, this temperature should be below 600° C., preferably between about 500–585° C., so that a minimal temperature differential is obtained between the sealing temperature and the substrate temperature without harming the phosphor coatings. The relatively low expansion of borosilicate glass represents an advantage during this process, rendering the glass substrate less prone to cracking in sealing. An oven with programmed temperature profile can be advantageously used for the sealing and the subsequent slow cooling processes.

The following example further illustrates the present invention. It is to be understood that following example is for illustration only and is not meant to limit the claimed invention in any way.

EXAMPLE

In this example, a beaded electrode lead-solder glass preform assembly as illustrated in FIG. 2 was prepared and sealed to a one-piece borosilicate glass flat panel lamp envelope.

A devitrifying solder glass powder from SEM-COM Company, Toledo, Ohio, product name SCC-7, which has an approximate CTE from 0 to 300° C. of $35 \times 10^{-7}$ °$C.^{-1}$, an approximate before-sealing softening point of 632° C. and an approximate devitrifying temperature $T_d$ of 670° C. was used in this example. A beaded lead as illustrated in FIG. 1 was used to form the assembly. The lead had a stranded nickel outer lead 11, a tungsten intermediate lead 15 hermetically sealed with a Nonex® solder glass 17, and a nickel inner lead 13. The beaded lead wire is commercially available from The Fredericks Company, Huntington Valley, Pa.

1.0 gram of the solder glass powder was mixed with a drop of ethanol, filled into a pressing die, pressed into disk shape to produce a greenish cylindrical preform having a diameter of 12.8 mm and a thickness of 3.2 mm. The preform was pre-sintered at 590° C. for half an hour.

Afterwards, a hole was drilled in the center of the disk which had a size just enough to suspend the bead 17 of the lead wire shown in FIG. 1. The beaded lead wire was then inserted into the hole and placed in a manner such that the bead 17 was centered within the disk. The resulted assembly was then sintered at 620° C. for half an hour, whereby the bead 17 was bonded to the disk, though not forming an intimate and hermetic seal. An electrode was then welded to the inner lead 13. Thus an electrode-solder glass preform assembly was finalized.

The glass lamp envelope used in this example was manufactured using the method described in U.S. Pat. No. 6,301,932 and had a one-piece design. Rare-earth tri-phosphor coating was applied to the internal wall of the discharge channel of the lamp envelope. The glass of the lamp envelope had a composition consisting essentially, by weight on an oxide basis calculated from the batch material, of 77.4% $SiO_2$, 15.4% $B_2O_3$, 1.9% $Al_2O_3$ and 5.3% $Na_2O$, and had a CTE from 0 to 300° C. of approximately $38 \times 10^{-7}$° $C.^{-1}$. Three holes of about 6 mm in radius were drilled and to be sealed with electrodes and/or tubulations. The lamp envelope was placed into an oven and preheated to about 580° C. before sealing of the electrode assembly.

The electrode-solder glass preform assembly prepared above was inserted into one of the holes of the preheated lamp envelope after getters were placed into the discharge channel. The solder glass preform was placed on top of the hole with the lead wire in the center of the hole. Infrared radiation was applied to the solder glass to heat the preform to about 800–900° C. within 5 minutes. The solder glass preform softened and devitrified as a result and a hermetic seal was obtained. Subsequently, the lamp envelope was slowly cooled to room temperature. Further testing showed that the sealing was hermetic, and the phosphor coating and getters were not destroyed because of the sealing. No cracking on the lamp envelope was observed. XRD and SEM micrographic examinations showed that the desired glass/crystalline phases in the solder glass could be achieved in three minutes using infrared heating.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for hermetically sealing a component to a lamp envelope of a lighting device made of glass having a CTE $C_1$ from 0 to 300° C., comprising the following steps:
   (i) providing a component assembly comprising the component to be sealed with the lamp envelope and an infrared absorbing solder glass preform enclosing and bonded to the portion of the component to be hermetically sealed and affixed to the glass lamp envelope, wherein solder glass of the preform has a before-sealing softening point $T_s$ over 500° C., an after-sealing CTE $C_2$ from 0 to 300° C. in the range of $C_1 \pm 10 \times 10^{-7}$° $C.^{-1}$, and is capable of forming a hermetic sealing of the component with the lamp envelope upon being heated to a temperature over its before-sealing softening point;
   (ii) attaching the component assembly to a hole of the lamp envelope through which the component is to be sealed and affixed to the lamp envelope; and
   (iii) heating the solder glass preform locally using infrared radiation to a temperature higher than the before-sealing softening point $T_s$ of the solder glass to effect a hermetic sealing,
wherein the solder glass preform is formed from a devitrifying solder glass consisting essentially of a $B_2O_3$—$SiO_2$—PbO—ZnO glass containing CuO and/or $Fe_2O_3$, having a before-sealing softening point in the range of 550–700° C., an after-sealing CTE $C_2$ from 0 to 300° C. in the range of $32$–$40 \times 10^{-7}$° $C.^{-1}$ and a devitrifying temperature $T_d$ in the range of 630–750° C.

2. A process in accordance with claim 1, wherein the glass envelope is made of borosilicate glass having a CTE $C_1$ in the range of $30$–$45 \times 10^{-7}$° $C.^{-1}$ from 0 to 300° C., and a phosphor coating has been applied to the glass envelope before sealing thereof.

3. A process in accordance with claim 1, wherein the solder glass preform is formed from a solder glass consisting essentially, by weight percentage on an oxide basis, of: 0–2% of $Al_2O_3$, 15–25% of $B_2O_3$, 1–5% of CuO, 0–5% of $Fe_2O_3$, 0–7% of PbO, 10–16% of $SiO_2$ and 55–65% ZnO, and having a before-sealing softening point in the range of 600–650° C., an after-sealing CTE $C_2$ from 0 to 300° C. in the range of $34$–$38 \times 10^{-7}$° $C.^{-1}$ and a devitrifying temperature $T_d$ in the range of 650–700° C.

4. A process in accordance with claim 1, wherein the glass envelope is made of a borosilicate glass having the following composition, expressed in terms of weight percentage on an oxide basis calculated from the glass batch: 77.4% $SiO_2$, 15.4% $B_2O_3$, 1.9% $Al_2O_3$ and 5.3% $Na_2O$, and having a CTE of approximately $38 \times 10^{-7}$° $C.^{-1}$ from 0 to 300° C.

5. A process in accordance with claim 2, wherein the glass envelope is preheated to a temperature below 600° C. before step (iii).

6. A process in accordance with claim 5, wherein the glass envelope is preheated to a temperature between about 550–585° C.

7. A process in accordance with claim 1, wherein the component to be sealed and affixed to the glass envelope is a beaded electrode lead wire.

8. A process in accordance with claim 7, wherein the beaded electrode lead wire has an inner lead, an outer lead and an intermediate lead, and the intermediate lead has a hermetically sealed solder glass bead therewith.

9. A process in accordance with claim 8, wherein the solder glass bead of the beaded lead wire is bonded and attached to the solder glass preform by sintering at a temperature lower than the before-sealing softening point $T_s$ of the solder glass preform.

10. A process in accordance with claim 9, wherein the solder glass preform has a shape directly receivable by or capable of covering the hole of the glass envelope through which the solder glass preform beaded electrode wire assembly is to be sealed and affixed to the lamp envelope.

11. A process in accordance with claim 10, wherein the solder glass preform enclosing the lead wire consists of two integrated parts $P_1$ and $P_2$ having different cross-sectional sizes, $P_1$ has a smaller cross-sectional size receivable by the hole of the lamp envelope through which the component assembly is to be sealed and affixed, and part $P_2$ has a larger cross-sectional size capable of covering the hole when $P_1$ is inserted into and received by the hole.

12. A process in accordance with claim 2, wherein the component to be sealed and affixed is a borosilicate glass tubulation having a CTE $C_3$ in the range of $C_1 \pm 10 \times 10^{-7}$.

13. A process in accordance with claim 12, wherein the tubulation is bonded to the solder glass preform by sintering at a temperature below the before-sealing softening temperature $T_s$ of the solder glass of the preform.

14. A process in accordance with claim 13, wherein the component enclosed by the solder glass preform is to be affixed to the lamp envelope as an exhaust tubulation.

15. A process in accordance with claim 13, wherein the solder glass preform enclosing the tubulation has a shape receivable by or capable of covering the hole of the lamp envelope through which the component assembly is to be sealed and affixed.

16. A process in accordance with claim 13, wherein the solder glass preform enclosing the tubulation consists of two integrated parts $P_1$ and $P_2$ having different cross-sectional sizes, $P_1$ has a smaller cross-sectional size receivable by the hole of the lamp envelope through which the component assembly is to be sealed and affixed, and part $P_2$ has a larger cross-sectional size capable of covering the hole when $P_1$ is inserted into and received by the hole.

17. A process in accordance with claim 15 or 16, wherein the component assembly to be sealed and affixed to the lamp envelope further comprises a beaded electrode lead wire placed inside the tubulation, the beaded lead wire and the tubulation are chosen and placed in a manner such that upon prior or further heating of the tubulation, a hermetic seal can be effected between the beaded lead wire and the tubulation without causing substantial heating to the glass envelope to which the assembly is to be sealed and affixed.

18. A process in accordance with claim 1, wherein the heating time in step (iii) is less than 5 minutes.

19. A process in accordance with claim 18, wherein the heating time in step (iii) is less than 3 minutes.

20. A process in accordance with claim 19, wherein the heating time in step (iii) is less than 1 minute.

21. A process in accordance with claim 18, wherein the infrared radiation source is a linear focused infrared light beam.

22. A process in accordance with claim 21, wherein multiple infrared radiation sources are used to provide multiple linear light beams converging on the solder glass preform.

* * * * *